US 6,647,840 B2

(12) United States Patent
Luik

(10) Patent No.: US 6,647,840 B2
(45) Date of Patent: Nov. 18, 2003

(54) COMBINED VIDEO CAMERA AND TOOLHOLDER

(76) Inventor: Ilmar Luik, 169 Bolling Rd., Meridianville, AL (US) 35759

( * ) Notice: Subject to any disclaimer, the term of this patent is extended or adjusted under 35 U.S.C. 154(b) by 62 days.

(21) Appl. No.: 09/841,201

(22) Filed: Apr. 24, 2001

(65) Prior Publication Data

US 2002/0002885 A1 Jan. 10, 2002

Related U.S. Application Data

(60) Provisional application No. 60/199,625, filed on Apr. 25, 2000.

(51) Int. Cl.[7] .............................. B23B 25/00; B23B 7/00
(52) U.S. Cl. .............................. 82/118; 82/152; 408/16; 409/134
(58) Field of Search ............................ 408/16; 409/134, 409/234; 33/613, 645; 73/431, 866.5; 356/400; 82/150–152, 156, 170, 118

(56) References Cited

U.S. PATENT DOCUMENTS 4,941,106 A  *  7/1990  Krieger ........................ 364/513
5,427,484 A  *  6/1995  Galli .......................... 409/234
5,956,253 A  *  9/1999  Gottschalk ............. 364/474.28

FOREIGN PATENT DOCUMENTS

DE          3912663      * 10/1990 ..................... 125/2

* cited by examiner

Primary Examiner—Derris H. Banks
Assistant Examiner—Jamila Williams
(74) Attorney, Agent, or Firm—Mark Clodfelter

(57) ABSTRACT

A method and apparatus for indicating a reference point on a workpiece for a program in a CNC machine tool is disclosed. A camera is mounted in a CNC toolholder so that the lens of the camera is coaxial with a rotational axis of the CNC toolholder. A pair of crosshairs or other indica are provided in the view from the camera, the crosshairs being centered in the view so that when the camera is mounted in the toolholder, the crosshairs indicate the center of rotation of the toolholder. The camera may then be positioned with respect to the workpiece so that it images an area of the workpiece containing a reference point with respect to the coordinate system of the CNC program. The toolholder is then adjusted so that the crosshairs are directly on the desired reference point, and this reference point entered into the CNC program.

17 Claims, 3 Drawing Sheets

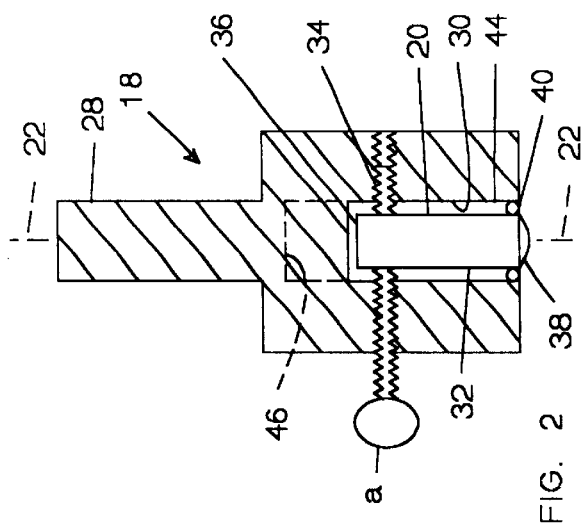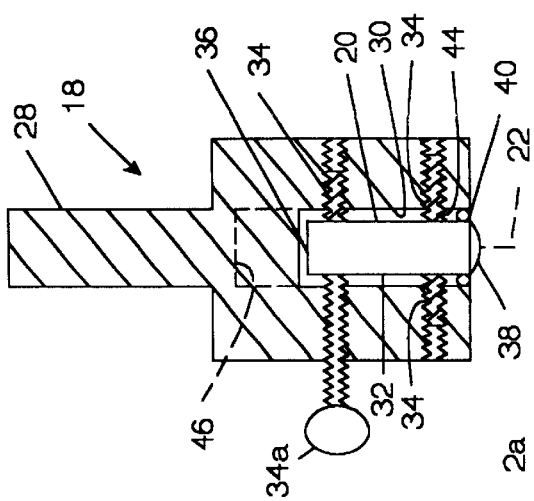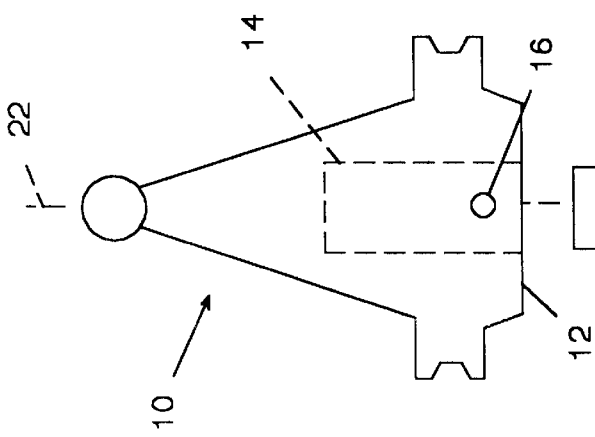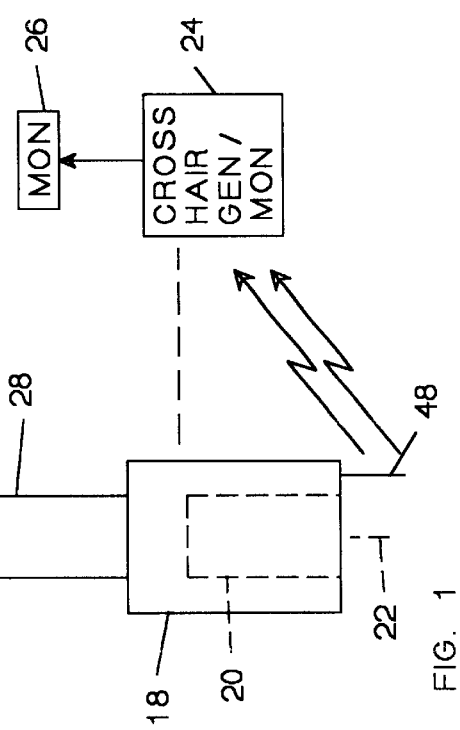
FIG. 2
FIG. 2a
FIG. 1

COMBINED VIDEO CAMERA AND TOOLHOLDER

CROSS REFERENCE TO RELATED APPLICATIONS

This application claims the benefit of Provisional Application Ser. No. 60/199,625, filed Apr. 25, 2000.

FIELD OF THE INVENTION

This invention relates to a video camera positioned along the axis of rotation of a toolholder, the toolholder being typical of a toolholder found in a computer controlled machine.

BACKGROUND OF THE INVENTION

One of the problems with computer controlled machine tools (CNC tools) is their relatively extensive setup time wherein an operator of the machine programs a computer with x, y and z coordinates related to a workpiece and establishes a reference point or origin, typically designated as 0, 0, 0, within these x, y and z coordinates. This is done by selecting a desired point on the workpiece to serve as the reference point and then moving a toolholder to a point directly above or to another position in a selected relationship with the reference point. This position of the toolholder is then designated as the 0, 0, 0 reference position. From this reference position, the computer then may guide the toolholder through a series of motions to effect drilling, milling and other machining operations that are referenced to the selected reference point.

In order to reduce setup time and facilitate the setup procedures, Applicant has developed an integral camera and toolholder wherein the view from the camera is centered about the axis of rotation of the toolholder. Crosshairs or other indicia indicating the exact axis of rotation of the integral toolholder and camera are electronically inserted into the video from the camera, both of which being displayed together on a monitor.

Accordingly, it is one object of the invention to provide such a toolholder that may be installed in a toolholding chuck of a CNC machine tool in order to optically establish a reference point for the machine tool. Other objects will become clear upon a reading of the following specification.

BRIEF DESCRIPTION OF THE DRAWINGS

FIG. 1 is a view showing a camera of the instant invention shown in exploded relation with a toolholder.

FIG. 2 is a cut-away section of a camera and housing of the instant invention.

FIG. 2a is a view similar to FIG. 2 showing construction details.

DETAILED DESCRIPTION OF THE DRAWINGS

Figure 3:
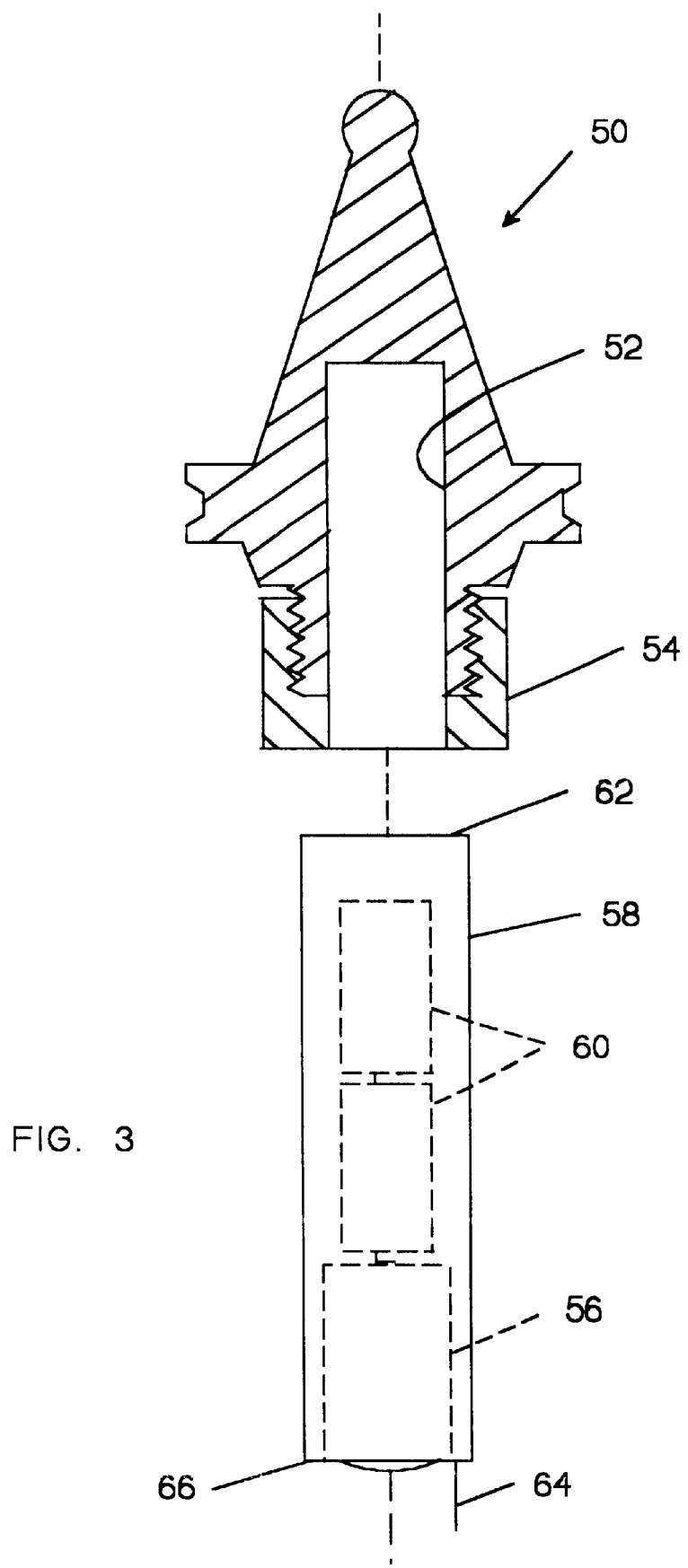
FIG. 3 is a cut-away view of a toolholder including a chuck and another embodiment of a camera and housing of the instant invention.

Referring initially to FIG. 1, a toolholder 10 is shown, this toolholder being of the type conventionally used in computer numeric controlled (CNC) machine tools. These toolholders are configured at an end 12 for receiving or otherwise handling a plurality of types of machine tools such as drills, milling tools, taps and others. In some instances, the toolholder may be particularly configured to receive a particular type of tool, and in other instances the toolholder may receive different types of tools. For instance, one type of toolholder may be configured having an end 12 provided with a threaded shaft upon which a chuck may be mounted, which chuck receiving a variety of drills, end mills or the like. Another toolholder, as shown in FIG. 1, is provided with an end 12 having a smooth bore 14 coaxial with the center of rotation of the toolholder, with a tool inserted into bore 14 being locked in place by a setscrew 16 or other type latch or clamp. For accuracy, a shaft portion (of a tool) that is to be fitted into bore 14 is constructed so that it will closely fit in bore 14, and be held in place by setscrew 16. In some instances, a shaft of the tool may be keyed so that the setscrew or other latch bears on a flat surface of the shaft.

Applicant has provided, in a ruggedized housing 18, a small camera, which may be a miniature CCD or similar camera 20, such as a "lipstick"-type camera. One example of such a camera is model PC 51, manufactured by SUPERCIRCUITS, INC at One Supercircuits Plaza, Leander, Tex. Camera 20 is mounted in housing 18 so that a lens of the camera is coaxial with an axis of rotation 22 of housing 18, housing 18 in turn being coaxial with an axis of rotation of toolholder 10 when mounted in bore 14. Housing 18 is further provided with a shaft 28 closely dimensioned so as to closely fit bore 14 in toolholder 10 as described.

Figure 4A:
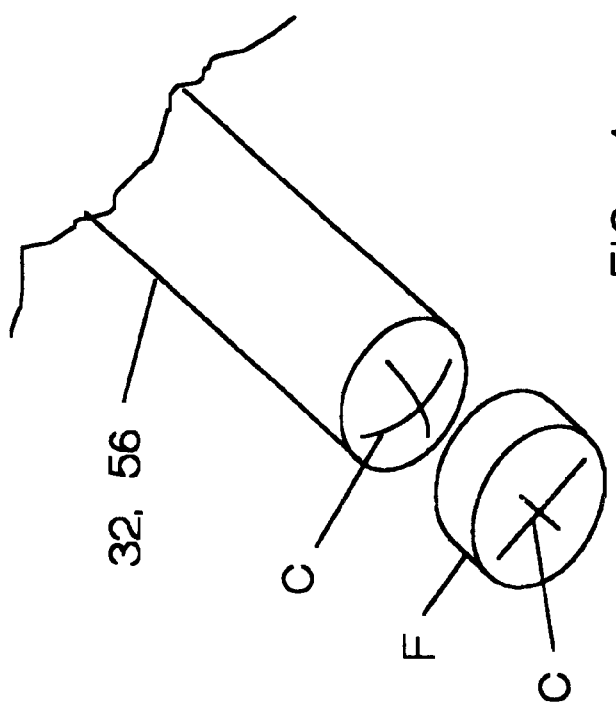
FIG. 4a is a view of one way crosshairs may be incorporated in the present invention.

The video signal from camera 20 may be transmitted by a radio or infra-red link, or picked up by slip rings or other conductors adapted for transferring signals between rotating components. Where an infrared link is used, provisions may be made so that the link is maintained when the tool is rotated. The video so obtained is applied to a cross hair or other graphic generator 24 and subsequently to a monitor 26, the crosshair generator 24 serving to insert cross hairs or some other indication of the center of the view of the camera. It is to be noted that the crosshairs are linked with the video such that they move with the video. Alternately, as shown in FIG. 4a, the crosshairs C may be permanantly scribed or etched on the lens of the camera, or incorporated on a transparent cover or filter F fitted over the lens end of the camera as by screw threads or by friction. In these instances, the crosshairs or other indicia would thus need to be within the focal length of the camera lens so as not to be blurred. Here, in addition to or in place of crosshairs, other graphics that would assist an operator in locating specific features or a reference point may be used. For example, circles based on a visible radius point, the radius point being set to the exact center of rotation of the toolholder, may be used to accurately locate a bore or circular opening in a workpiece. Here, a single circle may be used, and which is adjustable in size so as to match a size of an opening on the workpiece in order to precisely locate an opening to be used as a reference point. Likewise, straight lines that are rotatable may be used in conjunction with a point indicating a center of rotation of the toolholder where edges or corners are to serve as a reference point.

Housing 18 is shown in greater detail in FIG. 2. Here, it is seen that camera 20 may be mounted in a bore 30 in housing 18 that is somewhat larger than an exterior housing 32 of camera 20. A plurality of setscrews 34 may be provided around an exterior upper end 36 of camera 20, these setscrews serving to adjustably support camera 20 at its upper end 36. Alternately, instead of setscrews, thumbscrews 34a may be used to provide more convenient adjustment of the camera. A lower end 38 of camera 20 may be relatively tightly but flexibly supported by an elastomer mount, such as an O-ring 40 fitted in a groove 42 of a lower interior region 44 of bore 30. Additionally, a shock absorbing mount may be provided at the upper end 36 of camera 20, such as a ring of relatively stiff rubber around camera housing 32 on which setscrews 34 bear. With such a mounting, camera 20 is rigidly held in place in bore 44 of housing 18 but is isolated from vibration and shock. In another embodiment, setscrews 34 may also be provided at a lower end of the camera adjacent a lens thereof Here, the upper and lower setscrews would be adjusted in conjunction with one another in order to adjust an axis of the camera to coincide with an axis of rotation of the toolholder. In this embodiment, the resilient mounting may still be included in order to dampen vibrations. In addition, the setscrews may be made of an elastomer material, such as nylon, in order to dampen vibrations and prevent damage to the camera housing from overtightening of the setscrews.

Camera 20 may be powered by batteries incorporated into housing 18, with a video signal from the camera being transmitted by a short range radio link to a receiver. Alternately, and as stated, slip rings may be provided to provide power to the camera and pick off the video signal from the camera. In the instance where a video signal is transmitted by radio link, an antenna 48 may be provided in an end of housing 20.

In another embodiment, and as shown in FIG. 3, a toolholder 50 is shown having a relatively large bore 52 and a collet 54 or the like for holding a tool in bore 52. A camera 56 is mounted in a housing 58 sized to be closely fitted in the bore 52 of the toolholder. In this embodiment, housing 58 is sufficiently large so as to receive batteries 60 for powering the camera and associated electronics, which electronics including a short-range radio link for transmitting video to a receiver and cross-hair generator 24 (FIG. 1). As stated, an antenna 64 extending from an end 66 of housing 58 may be provided to transmit the video signal to the receiver. Access to the batteries may be provided by making end 62 of housing 58 removable, as by screw threads, in a similar manner as a flashlight. Power to the camera may be switched on and off by a switch (not shown) or by simply removing the batteries. The housing 58 may protrude from an end of the toolholder, or may be constructed so as to be flush therewith. Additionally, adjustment for the camera within housing 58 may be provided as described for camera 20 of FIG. 1.

Figure 4:
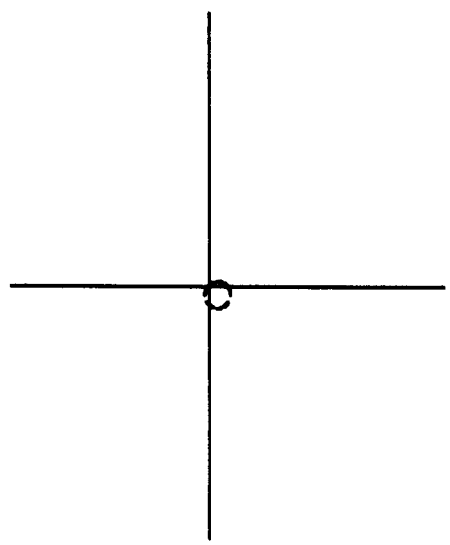
FIG. 4 is a view of crosshairs of the present invention.

In use, and referring to FIG. 1, camera 20 is mounted in housing 18, and housing 18 in turn mounted in a toolholder 10. The toolholder may then be inserted into or picked up by an automatic tool changer and secured in a spindle of the CNC machine tool. After the toolholder containing the camera is secured in the spindle, it may then be rotated to determine any misalignment of camera 20 from the axis of rotation 22 of toolholder 10. As shown in FIG. 4, with the crosshairs inserted into the view from camera 20, such misalignment becomes apparent when the toolholder is rotated. Here, the center point of the crosshairs will move in a circle (dashed lines) with rotation of the toolholder when the camera is not perfectly aligned with the axis of rotation 22. After it is determined that misalignment is present, the axis of camera 20 may be adjusted by appropriately turning setscrews 34 (or thumbscrews 34*a*) until the center of the crosshairs remains fixed on a single, rotating point as the toolholder is rotated. Alternately, instead of mounting housing 18 with camera 20 mounted therein as described, the housing 18 may be mounted in a centering chuck in turn mounted to a toolholder 10. In this embodiment, it would be assured that housing 18 would be centered on axis of rotation 22. The camera may then be adjusted as described so that the crosshairs are aligned with the axis of rotation of the toolholder. After being adjusted, the toolholder holding the camera may then be moved so that the crosshairs are centered on the reference point.

In the embodiment of FIG. 3, the housing 58 is inserted in the toolholder and collet 54 tightened to secure housing 58 therein. The toolholder is then mounted in the spindle of a CNC machine tool and the camera focused on the workpiece. The spindle is moved to center the crosshairs on a reference point on the workpiece and such point entered to designate the origin or other reference in the coordinate system used by the CNC tool.

In one embodiment, the camera may be powered by one or more batteries housed inside a compartment 46 (dashed lines) in housing 18 of FIG. 2. A miniature, short range transmitter may also be housed in compartment 46 for transmitting the video signal to a receiver associated with monitor 26. In another embodiment, the video signal may be transmitted via an infra-red link, with a transmitter mounted to or in housing 18 and a receiver associated with monitor 26. One or more infra-red reflectors may be positioned around the rotating toolholder to assure a contiguous link with the monitor. In yet another embodiment, an outer housing or shell (not shown) may be rotatably mounted around housing 18, the shell providing power and a video link from/to the camera by brushes or slip rings. In this instance, a power supply may be hard wired to the shell, and a video signal may be hardwired to the crosshair or other graphics generator, in turn coupled to the monitor. Of course, any combination of transmitters, inductive powering of the camera and possibly a transmitter, or hard wiring, may be used to provide power to at least the camera and to pick off a video signal from the camera.

As accuracy of the system described above is dependent on the crosshairs or other indica of the center of the field of view from the camera being exactly aligned with the axis of rotation of the toolholder, a magnifying lens may be employed to magnify the image taken by the camera. Such a lens may be replaceable so that lenses of differing magnification may be used depending on accuracy required for a particular machining operation. Also, during initial aligning of the camera, lenses of varying magnification may be successively used to achieve a high degree of accuracy.

During setup of a computer operated machine tool using Applicant's camera, the operator would cause the integral toolholder and camera to be inserted into the spindle of the machine tool. At that point, and with the crosshairs or other indica already centered about the toolholder's axis of rotation by any of the methods described above, the operator would move the spindle to locate the crosshairs at a point on a workpiece where a reference point or origin is to be designated, such as a 0, 0, 0 reference point in a Cartesian, polar, rectangular, or any other three dimensional coordinate system used by the CNC machine tool. Once the crosshairs are established at the desired reference position, this reference position is set in the computer. This eliminates the manual steps of using edge finders or dial gages, either separately or together, for setting the machine tool's coordinate axis to the desired location with respect to the position of the part to be machined. As stated above, where the reference is the center of a bore or opening, a radius-based circle may be used to accurately locate the center of the bore or opening.

Having thus described my invention and the manner of its use, it should be apparent to those skilled in the art that incidental changes may be made thereto that fairly fall within the scope of the following appended claims, wherein I claim:

1. A system for establishing a reference point in a CNC machine with respect to a workpiece comprising:
   a CNC toolholder adapted to receive a tool or implement in coaxial alignment with a center of rotation of said CNC toolholder,
   a first housing configured to be received in axial alignment with said CNC toolholder,
   a camera mounted in said first housing, said camera providing video signals to a monitor, and
   centering indica signals in said video signals, said centering indica signals aligned with said center of rotation of said CNC toolholder.

2. A system as set forth in claim 1 further comprising:
   a bore in said CNC tool holder in coaxial alignment with said center of rotation of said CNC tool holder,
   a shaft on said first housing and coaxially aligned therewith, said shaft constructed to closely fit within said bore so that said first housing may be locked in position coaxially aligned with said center of rotation of said CNC tool holder.

3. A system as set forth in claim 1 wherein said camera is constructed comprising:
   a generally tubular, second housing, and said first housing has a generally tubular recess to receive said second housing of said camera,
   a resilient mount in said tubular recess near an opening thereof,
   a plurality of adjustment screws positioned around said recess at an end thereof opposite said opening, said adjustment screws bearing against said camera in order to adjust position of said centering indica signals with respect to rotation of said toolholder.

4. A system as set forth in claim 1 wherein said first housing is configured having an opening for holding a battery for powering said camera.

5. A system as set forth in claim 1 wherein said camera transmits said video signals via a radio link to a receiver from which it is provided to a monitor.

6. A system as set forth in claim 1 wherein said toolholder is provided with a collet, and a recess for receiving said housing, said collet holding said camera in said recess.

7. A system as set forth in claim 1 wherein said centering indica signals are provided to said video signals by a graphics generator.

8. A system as set forth in claim 1 wherein said centering indica signals are developed by centering indica located on a lens of said camera.

9. A system as set forth in claim 1 wherein said centering indica signals are developed by centering indica located on a transparent cover over a lens of said camera.

10. Apparatus for establishing a reference point on a workpiece to be machined comprising:
    a toolholder for use in a CNC machine tool, said toolholder configured for holding a machining tool,
    a housing configured to be held by said toolholder and having a recess for receiving a camera, said recess in coaxial alignment with a rotational axis of said toolholder,
    a camera mounted in said recess and having a viewing lens coaxial with said rotational axis of said toolholder, said camera providing a view along said rotational axis,
    reference indica in said view for indicating position of said rotational axis.

11. Apparatus as set forth in claim 10 wherein said camera is mounted in a housing, and said housing is mounted in said recess.

12. Apparatus as set forth in claim 11 wherein said indica are crosshairs, with a center of said crosshairs indicating said rotational axis.

13. Apparatus as set forth in claim 12 wherein said indica are overlaid over a lens of said camera.

14. Apparatus as set forth in claim 12 wherein said indica are electronically provided to said view by an electronic crosshair generator.

15. Apparatus as set forth in claim 12 further comprising adjustments associated with said camera in order to adjust a position of said crosshairs in said view.

16. Apparatus as set forth in claim 13 wherein said camera is powered by batteries, and transmits a video signal to a receiver via a radio link.

17. A method for establishing a reference point on a workpiece to be machined comprising the steps of:
    1) mounting a camera in a CNC toolholder so that a rotational axis of said toolholder is in coaxial alignment with an axis of said lens,
    2) providing indica in a view from said camera of a center point of said view,
    3) aligning said center point of said view with said rotational axis of said toolholder,
    4) designating a point on said workpiece coinciding with said center point in said view as a reference.

* * * * *